United States Patent
Narasimhan

(10) Patent No.: US 9,635,492 B2
(45) Date of Patent: Apr. 25, 2017

(54) SYSTEMS AND METHODS FOR PERFORMING RADIO-FREQUENCY TESTING ON NEAR-FIELD COMMUNICATIONS CIRCUITRY

(71) Applicant: Apple Inc., Cupertino, CA (US)

(72) Inventor: Sowmiya Narasimhan, Fremont, CA (US)

(73) Assignee: Apple Inc., Cupertino, CA (US)

( * ) Notice: Subject to any disclaimer, the term of this patent is extended or adjusted under 35 U.S.C. 154(b) by 169 days.

(21) Appl. No.: 14/450,152

(22) Filed: Aug. 1, 2014

(65) Prior Publication Data

US 2016/0037286 A1    Feb. 4, 2016

(51) Int. Cl.
| | |
|---|---|
| *H04B 5/00* | (2006.01) |
| *H04B 5/02* | (2006.01) |
| *H04W 4/00* | (2009.01) |
| *H04W 24/10* | (2009.01) |

(52) U.S. Cl.
CPC .......... *H04W 4/008* (2013.01); *H04B 5/0043* (2013.01); *H04B 5/02* (2013.01); *H04W 24/10* (2013.01)

(58) Field of Classification Search
CPC ...... H04B 5/0043; H04B 17/00; H04B 17/11; H04B 17/21; H04B 17/318; H04B 17/373; H04B 5/0025; H04B 5/02; H04W 4/008
See application file for complete search history.

(56) References Cited

U.S. PATENT DOCUMENTS

| | | | |
|---|---|---|---|
| 8,412,112 B2 | 4/2013 | Foegelle | |
| 8,588,763 B2 | 11/2013 | Venkataraman | |
| 9,237,465 B1 * | 1/2016 | Tanner | H04W 24/04 |
| 2005/0101315 A1 * | 5/2005 | Yamaguchi | H04B 7/0617 |
| | | | 455/423 |
| 2007/0014341 A1 * | 1/2007 | Rowse | H04L 1/243 |
| | | | 375/224 |
| 2010/0030304 A1 * | 2/2010 | Haubrich | A61N 1/37223 |
| | | | 607/60 |
| 2011/0275421 A1 * | 11/2011 | Wong | H01Q 1/2225 |
| | | | 455/572 |

(Continued)

FOREIGN PATENT DOCUMENTS

WO    2014072406    5/2014

*Primary Examiner* — Sujatha Sharma
(74) *Attorney, Agent, or Firm* — Treyz Law Group, P.C.; Michael H. Lyons

(57) ABSTRACT

An electronic device may be provided with near-field communications (NFC) circuitry for communicating with external equipment. Test equipment may perform radio-frequency testing on the NFC circuitry. During manufacture of an electronic device having the NFC circuitry, the test equipment may be placed into electrical contact with antenna feed terminals on the NFC circuitry prior to attaching an antenna to the feed terminals so that a conductive path is formed between the test equipment and an NFC transceiver on the NFC circuitry. Test signals may be conveyed between the test equipment and the NFC transceiver over the conductive path for characterizing the performance of the NFC circuitry. The conductive path may include an antenna impedance modeling circuit formed on a circuit board substrate that models the impedance of the antenna that is to be attached to the NFC circuitry to allow for suitable power transfer during testing.

19 Claims, 7 Drawing Sheets

(56) References Cited

U.S. PATENT DOCUMENTS

| | | | | |
|---|---|---|---|---|
| 2012/0191400 | A1* | 7/2012 | Sontakke | G01R 31/31917 702/119 |
| 2013/0093447 | A1 | 4/2013 | Nickel et al. | |
| 2013/0271328 | A1* | 10/2013 | Nickel | G01R 29/10 343/703 |
| 2014/0160955 | A1 | 6/2014 | Lum et al. | |
| 2015/0093987 | A1* | 4/2015 | Ouyang | H04B 5/0043 455/41.1 |
| 2015/0249510 | A1* | 9/2015 | Dhayni | G01R 31/31716 455/41.1 |
| 2016/0036537 | A1* | 2/2016 | Liu | H04B 17/16 455/41.1 |

* cited by examiner

SYSTEMS AND METHODS FOR PERFORMING RADIO-FREQUENCY TESTING ON NEAR-FIELD COMMUNICATIONS CIRCUITRY

BACKGROUND

This relates generally to wireless communications circuitry, and more particularly, to electronic devices having wireless communications circuitry.

Electronic devices such as portable computers and cellular telephones are often provided with wireless communications capabilities. For example, electronic devices may use long-range wireless communications circuitry such as cellular telephone circuitry to communicate using cellular telephone bands. Electronic devices may use short-range wireless communications circuitry such as wireless local area network communications circuitry to handle communications with nearby equipment. Electronic devices can also be provided with satellite navigation system receivers and other wireless circuitry such as near-field communications circuitry. Near-field communications schemes involve electromagnetically coupled communications over short distances, typically 20 cm or less.

Wireless communications circuitry such as near-field communications circuitry is tested in a test system to ensure adequate radio-frequency performance. In conventional test systems, radio-frequency testing is performed on near-field communications circuitry after the near-field communications circuitry has been connected to a corresponding antenna and disposed within a fully-assembled electronic device. Components within the near-field communications circuitry are tested by swiping the fully-assembled electronic device over a near-field communications reader to determine whether the near-field communications circuitry is functioning properly. When performing testing in this manner using conventional test systems, the electronic device needs to be disassembled to replace the near-field communications circuitry when a failure is detected in the near-field communications circuitry during testing. Disassembling electronic devices to replace the near-field communications circuitry when a failure is detected can be difficult, time consuming, and cost prohibitive.

It would therefore be desirable to be able provide improved systems and methods for testing near-field communications circuitry.

SUMMARY

An electronic device may be provided with wireless communications circuitry. The wireless communications circuitry may include near-field communications (NFC) circuitry for performing near-field communications with external equipment (e.g., using near-field communications schemes that involve electromagnetically coupled communications over short distances of 20 cm or less and/or using a 13.56 MHz near-field communications frequency band).

A test system may be used to perform radio-frequency testing on the near-field communications circuitry to determine whether the near-field communications circuitry has adequate radio-frequency performance. The test system may perform test operations such as pass-fail testing on the near-field communications circuitry prior to assembling the near-field communications circuitry within a fully-assembled electronic device (e.g., prior to attaching a loop antenna to antenna feed terminals on the near-field communications circuitry).

The test system may include test equipment (e.g., a signal generator and/or signal analyzer) for testing the near-field communications circuitry. The test equipment may be placed into electrical contact with one or more antenna feed terminals on the near-field communications circuitry so that a conductive path is formed between the test equipment and a near-field communications transceiver on the near-field communications circuitry. Radio-frequency test signals (e.g., near-field communications test signals generated using a near-field communications protocol) may be conveyed between the test equipment and the near-field communications transceiver over the conductive path.

For example, the conductive path may include conductive traces on a test circuit board (e.g., a test printed circuit board). First radio-frequency contact structures (e.g., radio-frequency probe contacts) may be coupled between the conductive traces on the test circuit board and the test equipment and second radio-frequency contact structures (e.g., radio-frequency pogo pin contacts) may be coupled between the conductive traces on the test circuit board and the antenna feed terminals of the near-field communications circuitry (e.g., so that the first and second radio-frequency contact structures and the conductive traces form a part of the conductive path between the test equipment and the near-field communications transceiver).

If desired, the conductive path may include an antenna impedance modeling circuit formed on the circuit board. During testing, the radio-frequency test signals may be conveyed between the test equipment and the near-field communications transceiver in the near-field communications circuitry over the conductive path (e.g., through the radio-frequency contact structures, the conductive traces on the test PCB, the antenna feed terminals on the near-field communications circuitry, and the antenna impedance modeling circuit on the test PCB).

The test equipment and/or the near-field communications circuitry may generate performance metric data that characterizes the radio-frequency performance of the near-field communications circuitry based on the radio-frequency test signals. The test equipment may process the performance metric data to determine whether the near-field communications circuitry has sufficient radio-frequency performance. If the test equipment determines that the near-field communications circuitry has sufficient performance, the near-field communications circuitry may be assembled within a fully-assembled electronic device (e.g., a loop antenna may be attached to antenna feed terminals on the near-field communications circuitry, the near-field communications circuitry may be placed within a device housing, etc.). If the test equipment determines that the near-field communications circuitry has insufficient radio-frequency performance, the near-field communications circuitry may be discarded, reworked, repaired, etc. (e.g., without needing to disassemble a fully-assembled electronic device).

The test equipment may have a high impedance terminator such as a terminator having an impedance of 50 Ohms or more that loads the near-field communications circuitry during testing. The antenna impedance modeling circuit may model the impedance of the antenna that is to be connected to the near-field communications circuitry during device assembly (e.g., the antenna impedance modeling circuit may include some or all of the conductive traces and other resistive, conductive, and inductive components arranged in a selected manner to exhibit an impedance that models the impedance of an antenna that will be connected to the antenna feed terminals on the near-field communications circuitry if the near-field communications circuitry passes the radio-frequency testing). In this way, the antenna impedance modeling circuit may compensate for the 50 ohm terminator of the test equipment during testing. For example, the antenna impedance modeling circuitry may have an impedance of less than 50 Ohms (e.g., 20 Ohms) that models the impedance of a loop antenna to be mounted to the antenna feeds (e.g., loop antennas having an impedance of less than 50 Ohms). In this way, the antenna impedance modeling circuit may serve as a similar terminating load to the antenna during testing of the near-field communications circuitry even when the antenna has yet to be assembled onto the near-field communications circuitry (e.g., to allow for a maximum signal power transfer during testing).

If desired, the antenna impedance modeling circuit may be formed based on a desired design of the antenna to be attached to the near-field communications circuitry. For example, the test system may identify desired antenna parameters (e.g., an impedance of the antenna), may generate a circuit model based on the desired antenna parameters, and may pattern the conductive traces (and other resistive, inductive, and capacitive components) onto the circuit board based on the generated circuit model to form the antenna impedance modeling circuit.

Further features of the invention, its nature and various advantages will be more apparent from the accompanying drawings and the following detailed description of the preferred embodiments.

DETAILED DESCRIPTION

Electronic devices may be provided with wireless circuitry. The wireless circuitry may include near-field communications circuitry. For example, a near-field communications transmitter-receiver ("transceiver") may use a near-field communications antenna to transmit and receive near-field electromagnetic signals at a frequency such as 13.56 MHz. Near-field communications schemes involve near-field electromagnetic coupling between near-field antennas that are separated by a relatively small distance (e.g., 20 cm or less). The near-field communications antennas may be loop antennas.

Figure 1:
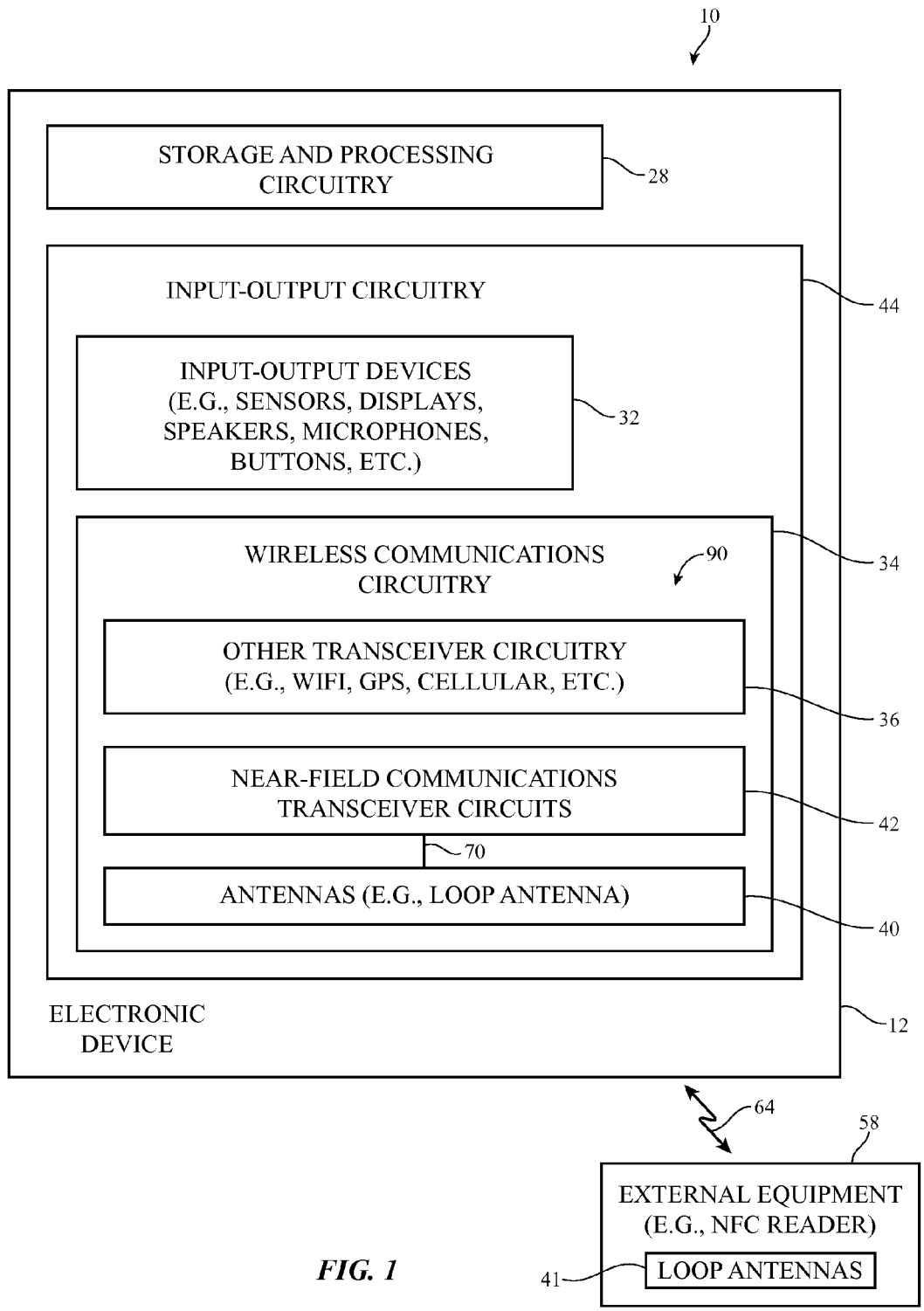
FIG. 1 is a schematic diagram of an illustrative electronic device with wireless communications circuitry such as near-field communications circuitry for communicating with external near-field communications devices in accordance with an embodiment of the present invention.

A schematic diagram of an illustrative configuration that may be used for an electronic device such as electronic device 10 is shown in FIG. 1. As shown in FIG. 1, electronic device 10 may include control circuitry such as storage and processing circuitry 28 and input-output circuitry such as input-output circuitry 44. Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements. Storage and processing circuitry 28, input-output circuitry 44, and other device components and circuitry may be formed within electronic device housing 10.

Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. The processing circuitry may be based on one or more microprocessors, microcontrollers, digital signal processors, baseband processors, power management units, audio codec chips, application specific integrated circuits, etc.

Storage and processing circuitry 28 may be used to run software on device 10, such as internet browsing applications, voice-over-internet-protocol (VOIP) telephone call applications, email applications, media playback applications, operating system functions, software for testing the radio-frequency performance of wireless communications circuitry 34 (e.g., a test operating system), etc. To support interactions with external equipment (e.g., a near-field communications reader, radio-frequency test equipment, etc.), storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, near-field communications protocols, etc.

Input-output circuitry 44 may be used to allow data to be supplied to device 10 and to allow data to be provided from device 10 to external devices. Input-output circuitry 44 may include input-output devices 32. Input-output devices 32 may include touch screens, buttons, joysticks, click wheels, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 32 and may receive status information and other output from device 10 using the output resources of input-output devices 32.

Wireless communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications).

Wireless communications circuitry 34 may include near-field communications circuitry 42. Near-field communications circuitry 42 may handle near-field communications at frequencies such as the near-field communications frequency of 13.56 MHz or other near-field communications frequencies of interest (e.g., a local high frequency (LHF) band for communicating in a near-field domain with external equipment over a range of 20 cm or less).

If desired, wireless communications circuitry 34 may include other transceiver circuitry 36 (e.g., non-near-field communications transceiver circuitry) for communicating in other frequency bands (e.g., for performing wireless communications with external equipment in the far-field domain). For example, transceiver circuitry 36 may include satellite navigation system receiver circuitry such as Global Positioning System (GPS) receiver circuitry (e.g., for receiving satellite positioning signals at 1575 MHz), wireless local area network transceiver circuitry for handling 2.4 GHz and 5 GHz bands for WiFi® (IEEE 802.11) communications and/or the 2.4 GHz Bluetooth® communications band, cellular telephone transceiver circuitry for handling wireless communications in cellular telephone bands such as bands in frequency ranges of about 700 MHz to about 2700 MHz or bands at higher or lower frequencies, or any other desired transceiver circuitry.

If desired, communications circuitry 34 may include circuitry for other short-range and long-range wireless links. For example, wireless communications circuitry 34 may include wireless circuitry for receiving radio and television signals, paging circuits, etc. In near-field communications, wireless signals are typically conveyed over distances of less than 20 cm. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antenna structures 40. Antenna structures 40 may include one or more antennas. Antennas structures 40 may be formed using any suitable antenna types. For example, antenna structures 40 may include antennas with resonating elements that are formed from loop antenna structures (e.g., antenna coil structures), patch antenna structures, inverted-F antenna structures, closed and open slot antenna structures, planar inverted-F antenna structures, helical antenna structures, strip antennas, monopoles, dipoles, hybrids of these designs, etc. Different types of antennas may be used for different bands and combinations of bands. For example, one type of antenna may be used in forming a local wireless link antenna and another type of antenna may be used in forming a remote wireless link. If desired, near-field transceiver circuitry 42 and non-near-field transceiver circuitry 36 may be coupled to respective antennas 40 or transceivers 42 and 36 may share one or more antennas 40.

Near-field communications circuitry 42 may be coupled to antenna structures 40. In one suitable arrangement, near-field communications circuitry 42 communicates using a loop antenna in antennas 40 (sometimes referred to herein as loop antenna 40). Near-field communications circuitry 42 (e.g., a near-field communications transceiver) uses antenna structures 40 to communicate with external near-field communications equipment 58 over near-field communications link 64. External equipment such as external equipment 58 may communicate with near-field communications circuitry 42 via magnetic induction, for example. Equipment 58 may include an antenna such as antenna 41 (e.g., a loop antenna) that is controlled by control circuitry on external equipment 58. Loop antenna 41 and a loop antenna formed from antenna structures 40 on device 10 may be electromagnetically coupled to support near-field wireless communications when loop antenna 41 and the loop antenna in structures 40 are within an appropriately close distance of each other such as 20 cm or less, as indicated by near-field communications signals 64. If desired, portions of the loop antenna in structures 40 may be formed from one or more conductive portions of housing 12 (e.g., from one or more portions of peripheral conductive housing structures that surround electronic device 10).

Device 10 may use near-field communications circuitry 42 and antenna structures 40 (e.g., the near-field communications loop antenna portion of antenna structures 40) to communicate with external near-field communications equipment 58 using passive or active communications. In passive communications, device 10 may use near-field communications circuitry 42 and antenna structures 40 to modulate electromagnetic signals 64 from equipment 58. In active communications, near-field communications circuitry 42 and antenna structures 40 may transmit radio-frequency electromagnetic signals 64 to external equipment 58.

Near-field transceiver circuitry 42 may be coupled to antenna structures 40 by signal paths such as signal path 70. Signal paths 70 may include transmission lines, portions of conductive housing structures, ground plane structures, traces on printed circuits, or other conductive paths. If desired, components such as impedance matching circuitry, filtering circuitry, balun circuitry, or other circuitry may be formed on path 70. Path 70 may couple near-field transceiver circuitry 42 to one or more antenna feeds (e.g., antenna feed terminals) on antenna 40. For example, NFC circuitry 42 may send and receive signals using antenna 40 via corresponding antenna feeds on antenna 40. Near-field transceiver circuitry 42 may feed antenna 40 using balanced or unbalanced signals.

Figure 2:
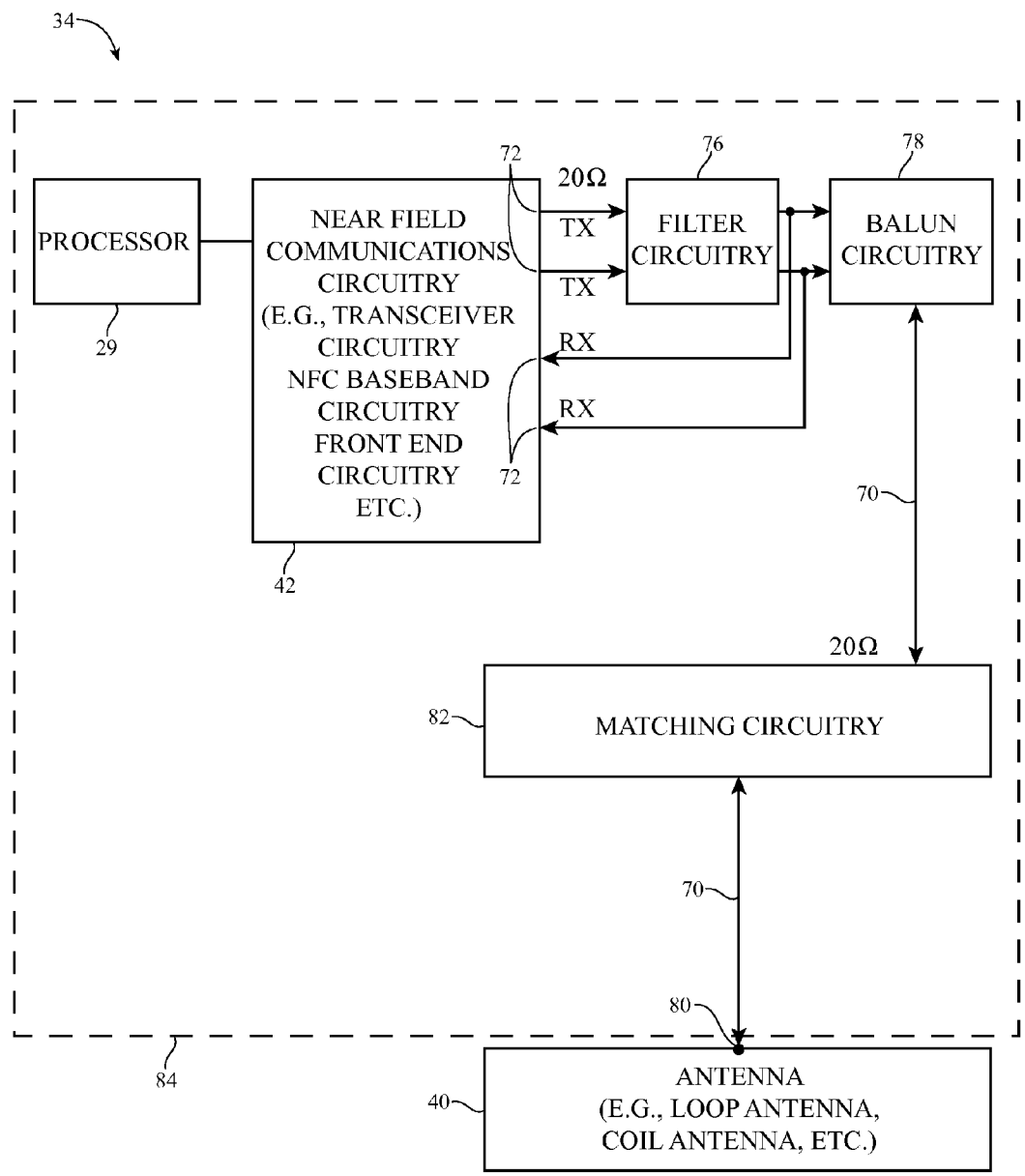
FIG. 2 is a diagram showing how near-field communications circuitry may be coupled to a corresponding antenna for transmitting and receiving near-field communications signals in accordance with an embodiment of the present invention.

FIG. 2 is an illustrative diagram showing how near-field communications circuitry such as near-field communications circuitry 42 of FIG. 1 may be coupled to antenna 40 for transmitting and/or receiving near-field communications signals using antenna 40. As shown in FIG. 2, near-field communications circuitry 42 may be coupled to processor 29. Processor circuitry 29 may include independent processing circuitry that is separate from storage and processing circuitry 28 of FIG. 1 or processor circuitry 29 may be formed as a portion of storage and processing circuitry 28 of FIG. 1. Processor circuitry 29 may send control signals to near-field communications (NFC) circuitry 42 and NFC circuitry 42 may send received data to processor 29. If desired, processor 29 may run test software or other desired software for operating NFC circuitry 42.

NFC circuitry 42 may include, for example, NFC baseband circuitry, NFC transceiver circuitry, NFC front end circuitry, or any other desired circuitry for transmitting and receiving near-field signals. Baseband circuitry in NFC circuitry 42 may, for example, receive digital data that is to be transmitted from processing circuitry 29 and may convert received signals into digital data that is provided to storage and processing circuitry 29. Circuitry 42 may include mixer circuitry that converts digital data processed by the baseband processor to an NFC frequency such as 13.56 MHz and that converts received data at an NFC frequency to a baseband frequency. Front end circuitry in NFC circuitry 42 may include filter circuitry, amplifier circuitry, matching circuitry, converter circuitry, multiplexing circuitry, switching circuitry, or any other desired circuitry for forming an interface between the transceiver circuitry and antennas 40.

NFC circuitry 42 may supply transmit signals TX over one or more transmit ports 72 and may receive signals RX via one or more receive ports 74. If desired, filter circuitry 76 may be coupled to transmit ports 72 to filter out undesired harmonics of transmit signals TX (e.g., signals that may leak onto receive ports 74 and cause undesired interference with receive signals RX).

If desired, near-field communications circuitry 42 may be coupled to antenna 40 using a balun such as optional balun circuitry 78. NFC circuitry 42 may have a differential output (e.g., signals TX output onto ports 72 referenced to each other) or a single-ended output (e.g., signals TX output onto a port 72 referenced to ground). In scenarios where NFC circuitry 42 is provided with a differential output, balun 78 may convert the differential output from circuitry 42 to single-ended signals for feeding the near-field communications antenna formed from antenna structures 40. In scenarios where NFC circuitry 42 has a differential output, signal path 70 may be referred to as a balanced signal path, whereas in scenarios where NFC circuitry has a single-ended output, signal path 70 may be referred to as an unbalanced signal path.

Antenna 40 may be fed via antenna feed terminals 80. Impedance matching circuitry such as matching circuitry 82 may be interposed on signal path 70 between optional balun circuitry 78 and antenna feed terminals 80. Matching circuitry 82 may include components such as inductors, resistors, and capacitors and may be used in matching the impedance of antenna 40 to the impedance of transmission line structures coupled to antenna 40. Matching network components may be provided as discrete components (e.g., surface mount technology components) or may be formed from housing structures, printed circuit board structures, traces on plastic supports, etc.

Antenna 40 may be fed using at least one antenna feeds terminal 80 (sometimes referred to herein as antenna feed points, antenna feed pads, feeds, feed points, or feed pads). Antenna feed terminals 80 may include a positive (signal) feed terminal and a negative (ground) feed terminal. In scenarios where path 70 is formed as a balanced signal path, NFC circuitry 42 may be coupled to the positive and ground feed terminals of antenna 40 via signal path 70, whereas in scenarios where path 70 is formed as an unbalanced signal path, NFC circuitry 42 may be coupled only to the positive feed terminal of antenna 40 via path 70.

If desired, one or more of processor 29, near-field communications circuitry 42, filter circuitry 76, balun circuitry 78, path 70, matching circuitry 82, and antenna feed terminals (antenna feed contact pads) 80 may be formed on a common substrate 84. Substrate 84 may be, for example, a dielectric substrate, a printed circuit board substrate (e.g., a rigid printed circuit board or flexible printed circuit board such as a flex circuit), a shared integrated circuit structure, or any other desired substrate. In one suitable arrangement, substrate 84 may be a logic board for electronic device 10 on which components 29, 42, 76, 70, 78, 80, and 82 are formed (sometimes referred to herein as a main logic board (MLB) or near-field communications board). If desired, components 29, 42, 70, 76, 78, 80 and 82 (e.g., the wireless communications circuitry associated with sending and receiving near-field communications signals) may be formed on a common substrate with non-near-field communications circuitry 36 (FIG. 1) or may be formed on a separate substrate from non-near-field communications circuitry 36. Circuit board 84 may sometimes be referred to herein as near-field communications board 84 or more simply as near-field circuitry 84.

Antenna 40 may be formed on a separate substrate from circuitry 84. For example, antenna 40 may be formed from conductive traces on a rigid or flexible substrate (e.g., an antenna flex circuit) that is separate from circuit board 84. Antenna 40 may be mounted (connected) to board 84 during assembly of device 10. For example, antenna 40 may be electrically connected to antenna feed terminals 80 when mounting antenna 40 to board 84. Antenna 40 may be electrically coupled to feed terminals 80 using a conductive connecting structure such as solder, conductive adhesive, spring-loaded pins, spring structures, welds, or any other desired conductive connection structure.

The radio-frequency performance of wireless communications circuitry 34 (e.g., of near-field circuitry 84) in device 10 may be characterized by one or more wireless performance metrics. Processor 29 and/or NFC circuitry 42 may generate data associated with wireless performance metrics in response to signals received from external test equipment. If desired, external test equipment may generate performance metric data associated with signals transmitted by NFC circuitry 42. For example, external test equipment, processor 29, and/or NFC circuitry 42 may generate performance metric data such as received power, transmitted power, receiver sensitivity, frame error rate, bit error rate, channel quality measurements based on received signal strength indicator (RSSI) information, Load Modulation Amplitude (LMA), any desired combination of these performance metrics, and other information that is reflective of the performance of near-field circuitry 84 in device 10. Performance metric data may, for example, include performance metric values measured for a given performance metric (e.g., measured error rate values, measured SNR values, measured RSSI values, etc.).

One or more radio-frequency test stations may be provided for performing radio-frequency tests (e.g., radio-frequency pass-fail test operations) on near-field communications circuitry in electronic devices such as device 10 (e.g., to ensure adequate radio-frequency performance of the near-field circuitry). Near-field communications circuitry that is being tested using the one or more radio-frequency test stations may sometimes be referred to as a device under test (DUT). The DUT may be, for example, a partially assembled electronic device (e.g., the DUT may include some or all of wireless circuitry 34 prior to completion of manufacturing). It may be desirable to test near-field circuitry 84 within partially assembled electronic devices so that near-field circuitry 84 can be more readily accessed during test operations (e.g., to test the performance of near-field circuitry 84 that has not yet been enclosed within a device housing).

In one suitable arrangement that is sometimes described herein as an example, near-field circuitry 84 (e.g., near-field circuit board 84) as shown in FIG. 2 may be tested using one or more radio-frequency test stations. Near-field circuits 84 under test may sometimes be referred to herein as DUTs 84'. This example is merely illustrative. If desired, test stations may perform radio-frequency test operations on any desired portion of device 10 (e.g., some or all of wireless communications circuitry 34, etc.). In general, by performing radio-frequency testing on near-field circuitry 84 (e.g., prior to assembly of circuitry 84 into a fully-assembled device 10), disassembly of a fully assembled device to replace or re-work one or more components of near-field circuitry 84 that fails testing may be omitted, thereby reducing the time and resources required to test and assemble the device relative to scenarios where radio-frequency testing is performed on a fully assembled device.

Figure 3:
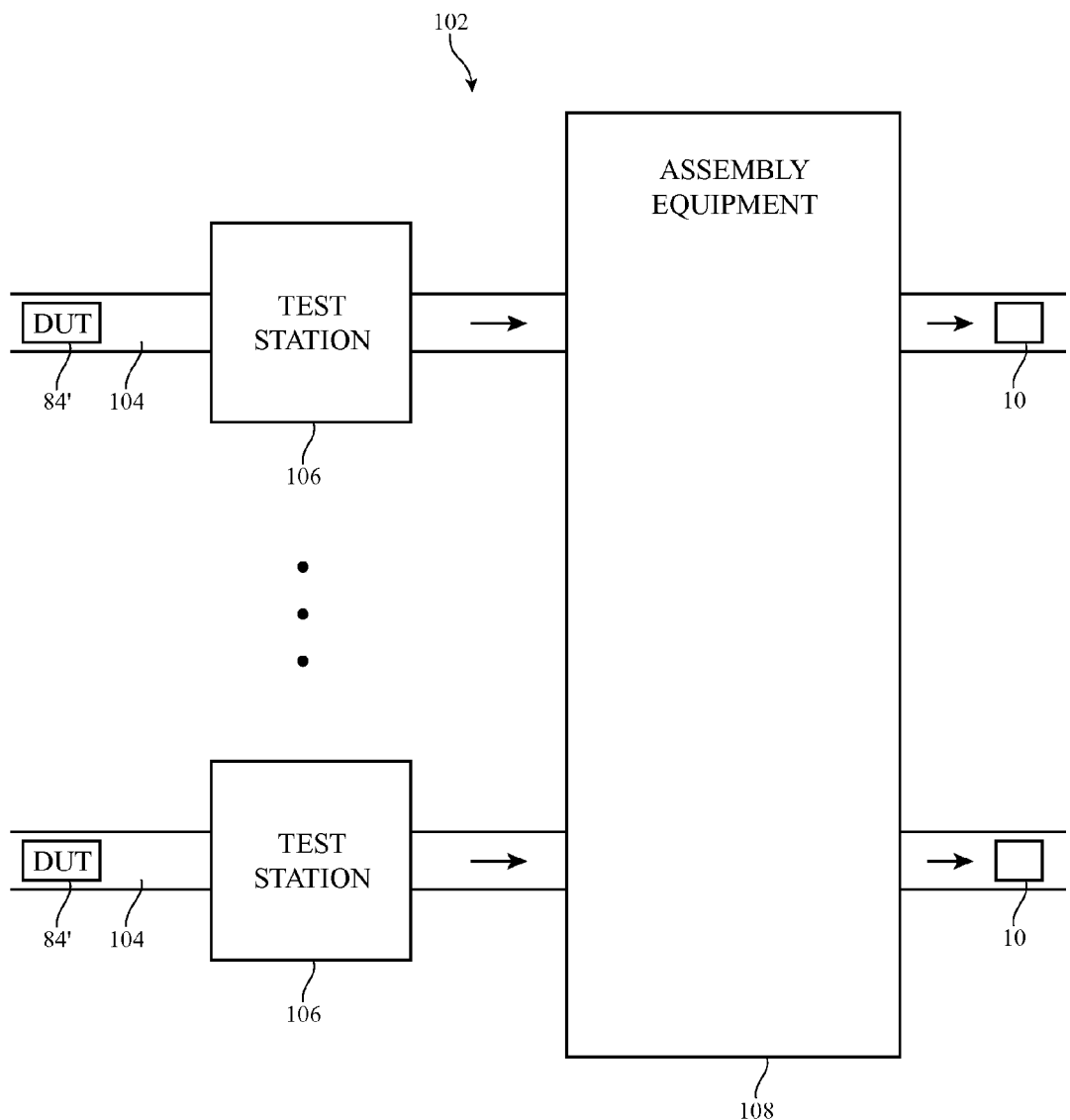
FIG. 3 is a diagram of an illustrative test system for testing near-field communications circuitry prior to assembly of the near-field communications circuitry within an electronic device of the type shown in FIG. 1 in accordance with an embodiment of the present invention.

In accordance with an embodiment of the present invention, electronic devices 10 may be manufactured (assembled) using a manufacturing system such as manufacturing system 102 as shown in FIG. 3. If desired, manufacturing system 102 may manufacture a number of electronic devices 10 simultaneously (e.g., many electronic devices 10 may each be assembled on a respective assembly line in parallel). Manufacturing system 102 may manufacture electronic devices 10 by assembling different components within production devices (e.g., components such as near-field circuitry 84, antennas 40, housing 12, wireless communications circuitry 34, etc.). Manufacturing system 102 may test the performance of components for use in electronic devices 10 (e.g., by gathering performance metric data from DUTs 84') using one or more test stations 106 (sometimes referred to herein as test systems).

In order to test the performance of many DUTs 84' for use in electronic devices 10 simultaneously, manufacturing system 102 may include a number of assembly lines 104 that each convey a respective DUT 84' to test stations 106 in parallel. Test stations 106 may be any suitable test stations for characterizing the performance of DUTs 84'. For example, test stations 106 may gather radio-frequency performance metric data associated with DUTs 84' and may process the radio-frequency performance metric data to characterize the radio-frequency performance of DUTs 84'. DUTs 84' that have sufficient radio-frequency performance may be labeled as "passing" components, whereas DUTs 84' that have insufficient radio-frequency performance may be labeled as "failing" components. Passing components may be conveyed to assembly equipment 108 via assembly lines 104 for further assembly, whereas failing components may be discarded or reworked.

Assembly equipment 108 may further assemble DUTs 84' within a corresponding electronic device 10. Assembly equipment 108 may, for example, modify circuitry 84', attach circuitry 84' to additional components, combine multiple circuits 84', etc. In one suitable example, assembly equipment 108 may attach components 84' to antenna circuitry such as loop antenna 40 (FIG. 1) and may enclose components 84' within a housing such as housing 12. If desired, loop antenna 40 may be formed from one or more portions of housing 12. Devices 10 with assembled components may be further tested by other test stations, if desired.

By forming DUTs 84' without a corresponding antenna and performing radio-frequency testing on the DUTs using test stations 106 prior to attachment of the antenna, test stations 106 may perform radio-frequency testing on NFC circuitry 42 without compensating for variations in antenna 40 (e.g., radio-frequency test stations 106 may characterize the performance of NFC circuitry 84 independently from the radio-frequency performance of the corresponding antenna).

In some radio-frequency test systems, the performance of non-near-field wireless circuitry such as wireless circuitry 36 (FIG. 1) is characterized by coupling test equipment such as a signal generator and signal analyzer to antenna feed points using a coaxial connector such as a 50 Ohm coaxial connector. The 50 Ohm coaxial connector suitably matches the input impedance of antennas used by the non-near-field wireless circuitry.

However, in near-field communications systems (e.g., near-field circuitry 84) that communicate using a near-field loop antenna such as loop antenna 40, the input impedance of the loop antenna may be less than 50 Ohms. For example, loop antennas used for near-field communications may be 20 Ohms, 10 Ohms, or any other desired impedance that is less than 50 Ohms. In order to properly transmit signals using loop antenna 40 (e.g., to form a suitable resonance on antenna 40 without generating undesired reflected signals, etc.), near-field circuitry 84 may be configured to exhibit an impedance that matches the input impedance of loop antenna 40. For example, the impedance of the near-field circuitry 84 may be less than 50 Ohms (e.g., the near-field circuitry 84 may have an impedance of 20 Ohms in scenarios where the input impedance of antenna 40 is 20 Ohms, etc.). In other words, near-field circuitry 84 may be provided with a terminated (output) impedance load of less than 50 Ohms.

When performing radio-frequency testing on near-field circuitry 84, a 50 Ohm coaxial cable connector may be unsuitable for coupling near-field circuitry 84 to external test equipment during manufacture of device 10 (e.g., prior to attachment of antenna 40 to circuitry 84). For example, as near-field circuitry 84 has an output impedance of less than 50 Ohms, near-field circuitry 84 may be unable to generate a suitable resonance (e.g., using radio-frequency signals transmitted by NFC transceiver 42) when coupled to the test equipment prior to attachment of antenna 40 to circuitry 84 (e.g., because near-field circuitry 84 is not provided with a terminated impedance load that suitably matches the impedance of NFC circuitry 42 and the other components of circuitry 84). It may therefore be desirable to be able to provide improved methods for performing radio-frequency testing on near-field circuitry 84.

Figure 4:
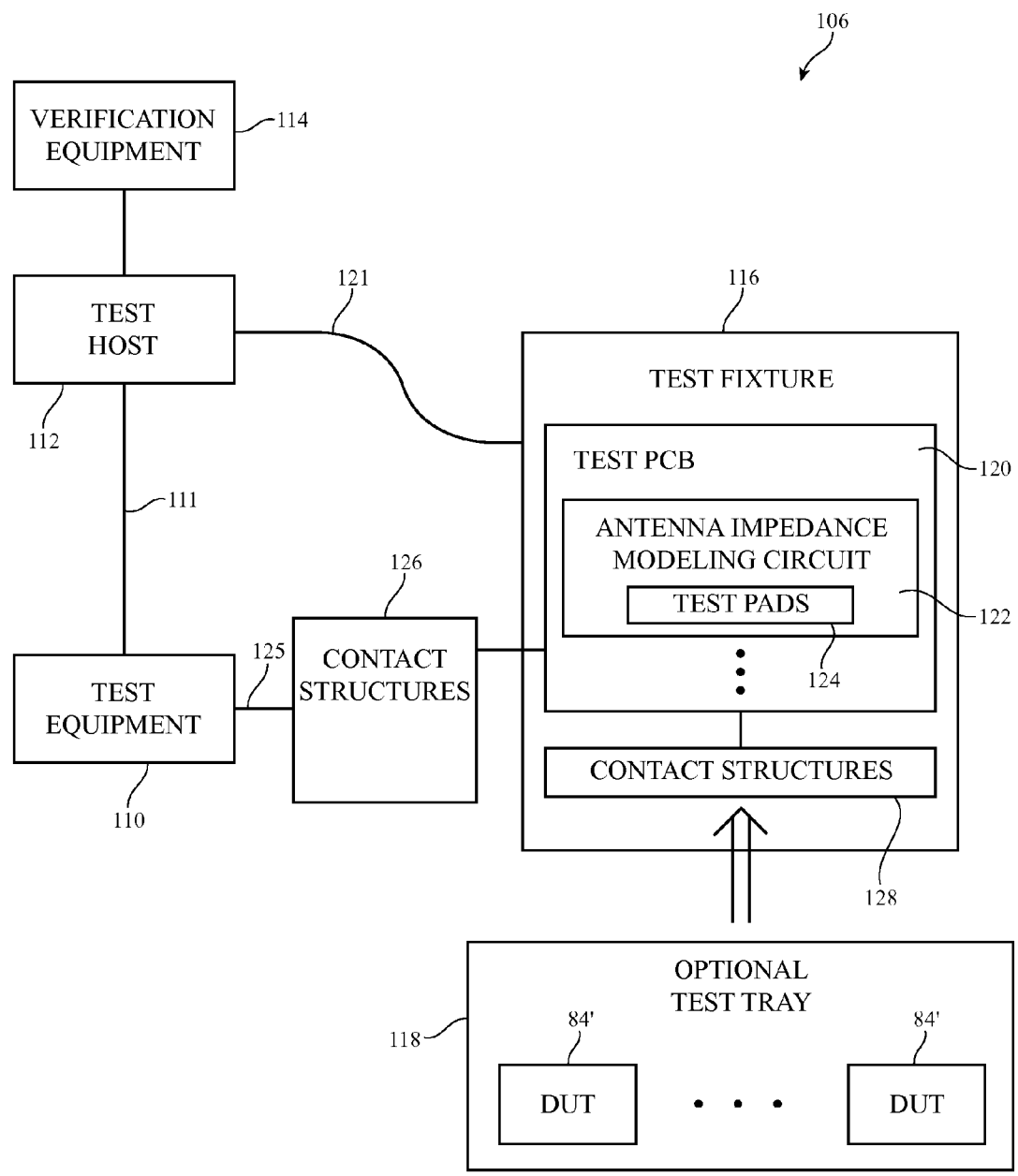
FIG. 4 is a diagram of an illustrative test system for performing radio-frequency tests on near-field communications circuitry prior to assembly of the near-field communications circuitry within a fully-assembled electronic device in accordance with an embodiment of the present invention.

If desired, radio-frequency test systems may be provided with antenna impedance modeling circuitry for performing radio-frequency testing on near-field circuitry 84. FIG. 4 is an illustrative diagram of a system for performing radio-frequency testing on near-field circuitry such as near-field circuitry 84 of FIG. 2 using antenna impedance modeling circuitry. As shown in FIG. 4, test system 106 (e.g., a test system such as test station 106 of FIG. 3) may include test equipment 110, computing equipment such as test host 112 and optional verification equipment 114, and a test fixture such as test fixture 116.

Test host 112 may be formed from computing equipment such as a personal computer, laptop computer, tablet computer, handheld computing device, or any other desired computing equipment. Verification equipment 114 may include computing equipment such as a personal computer, laptop computer, tablet computer, handheld computing device, or any other desired computing equipment. If desired, verification equipment 114 and test host 112 may be formed from shared computing equipment (e.g., one or more shared personal computers, etc.). Test equipment 110 may include equipment for generating radio-frequency test signals to be provided to DUTs 84' and may include equipment for receiving signals from DUT 84' and analyzing the received signals (e.g., equipment 110 may include a signal generator, signal analyzer, spectrum analyzer, vector network analyzer, oscilloscope, display equipment such as a computer monitor or other types of display screens, or any other desired equipment for generating radio-frequency test signals and performing radio-frequency measurements on signals received from DUTs 84').

Test equipment 110 may be operated directly or via computer control (e.g., when test equipment 110 receives commands from test host 112). When operated directly, a user may control test equipment 110 using a user input/output interface of test equipment 110. For example, a user may press buttons in a control panel on test equipment 110 while viewing information that is displayed on a display in test equipment 110. In computer controlled configurations, test host 112 (e.g., software running autonomously or semi-autonomously on test host 112) may communicate with tester equipment 110 by sending and receiving control signals and data over path 111.

Test fixture 116 may receive one or more devices under test 84' during radio-frequency testing operations. For example, one or more DUTs 84' may be placed on test fixture 116 or may be otherwise mounted to test fixture 116 during testing. If desired, multiple DUTs 84' may be mounted to optional test tray 118. Test tray 118 may be inserted into or mounted to test fixture 116 during testing. If desired, test host 112 may be coupled to test fixture 116 via path 121 (e.g., a universal serial bus USB path or any other desired data path). Test host 112 may provide control signals such as test commands to fixture 116 via path 121 and/or may receive test data from test fixture 116 over path 121.

Test fixture 116 may include one or more test circuit boards for coupling test equipment 110 to near-field communications DUTs 84'. Test circuit boards on fixture 116 may include printed circuit boards (PCBs) such as test PCB (TPCB) 120 as shown in FIG. 4. Test PCB 120 may be formed as a rigid or flexible printed circuit board. One or more antenna impedance modeling circuits 122 may be formed on test PCB 120. For example, antenna impedance modeling circuit 122 may be formed from conductive traces (e.g., patterned traces) on TPCB 120, from discrete components (e.g., surface mount components or embedded components) on TPCB 120, or from a combination of conductive traces and discrete components. Antenna impedance modeling circuit 122 may include a number of inductive, capacitive, and resistive components (elements) for modeling the impedance load of one or more loop antennas 40. For example, a given antenna impedance modeling circuit 122 may be patterned onto test PCB 120 so that the modeling circuit has a selected impedance that matches the impedance of a given loop antenna 40. If desired, multiple antenna impedance modeling circuits 122 may be formed on TPCB 120 for testing multiple DUTs 84' in parallel.

Each antenna impedance modeling circuit 122 may include corresponding conductive test pads 124. Test pads 124 may be formed from conductive contacts (e.g., conductive pad traces on TPCB 120) corresponding to the feed terminals of the antenna that is modeled by the corresponding impedance modeling circuit 122. Test equipment 110 may be connected to antenna impedance modeling circuits 122 on test PCB 120 via path 125 and corresponding test equipment contact structures 126. Test equipment contact structures 124 may include radio-frequency probe structures having radio-frequency probe contacts (e.g., probe tips) or any other desired radio-frequency contact structures (e.g., two or more radio-frequency probe contacts may be coupled between test equipment 110 and each antenna impedance modeling circuit 122 for testing multiple DUTs 84' in parallel). For example, contacts 124 may include signal and ground contacts that are electrically connected between test equipment 110 and test pads 124 (e.g., to corresponding signal and ground test pads on each impedance modeling circuit 122).

As shown in FIG. 4, test fixture 116 may include radio-frequency contact structures 128 that are coupled to test PCB 120. Contact structures 128 may be electrically connected to test pads 124 in each impedance modeling circuit 122. Contact structures 128 may electrically connect antenna feed terminals 80 on DUTs 84' to a corresponding antenna impedance modeling circuit 122 during testing. For example, when DUTs 84' are placed on test fixture 116, contact structures 128 may couple a the test pads of a respective antenna impedance modeling circuit 122 to a corresponding DUT 84' (e.g., contact structures 128 may include first signal and ground conductors that electrically connect signal and ground test pads 124 in a first antenna impedance modeling circuit 122 to corresponding antenna feed terminals 80 on a first DUT 84', may include second signal and ground conductors that electrically connect signal and ground test pads 124 in a second antenna impedance modeling circuit 122 to corresponding antenna feeds 80 on a second DUT 84', etc.).

Contact structures 128 may include any desired radio-frequency contact structures. For example, contact structures 128 may include radio-frequency probe contact structures having radio-frequency probe contacts (e.g., probe tips) or other radio-frequency contact structures such as pogo pins or spring contacts for contacting antenna feed terminals 80 on DUTs 84' when DUTs 84' are loaded onto test fixture 116. By electrically connecting test equipment contacts 126 to test pads 124 and electrically connecting antenna feeds 80 on DUTs 84' to test pads 124 via contact structures 128, test equipment 110 may provide radio-frequency test signals to and receive radio-frequency test signals from DUTs 84' (e.g., via contacts 126, path 125, test pads 124, and contacts 128). In other words, a conductive path may be formed between test equipment 110 and antenna feed terminals 80 on DUTs 84'. Antenna impedance modeling circuit 122 may serve as a similar terminating load for DUTs 84' as antennas 40 (e.g., when implemented in the completed device 10) and may thereby allow for proper resonance (e.g., a maximum power transfer) using DUT 84' during testing (e.g., regardless of the impedance of path 125 and contact structures 126). In this way, test equipment 110 may perform contact radio-frequency testing of NFC circuitry such as near-field DUTs 84' prior to completed assembly of device 10.

Verification equipment 114 may be used to verify the performance of test PCB 120, antenna modeling circuits 122, test fixture 116, contact structures 128 and 126, and/or test equipment 110 (e.g., to ensure that radio-frequency testing performed using test system 106 is accurate and reliable). If desired, verification equipment 114 may be formed as a part of test host 112 or at a location remote from test station 106.

Figure 5:
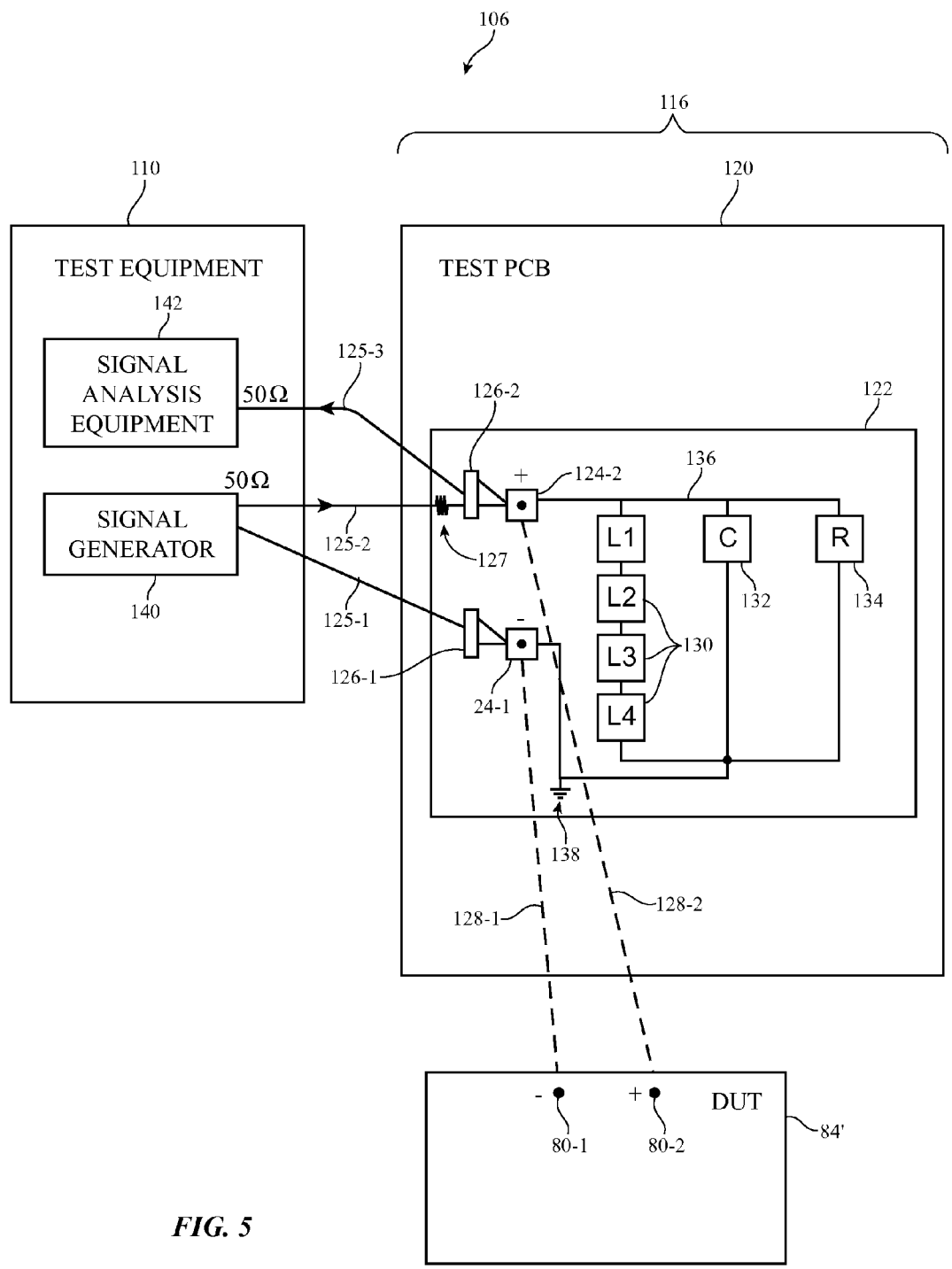
FIG. 5 is a diagram showing how radio-frequency test equipment may be electrically connected to antenna feed points on near-field communications circuitry via an antenna impedance modeling circuit for performing radio-frequency testing on the near-field communications circuitry in accordance with an embodiment of the present invention.

FIG. 5 is an illustrative diagram that shows how test equipment 110 may interface with a given DUT 84' through a corresponding antenna impedance modeling circuit 122 for performing radio-frequency testing on DUT 84'. As shown in FIG. 5, antenna impedance modeling circuit may include conductive traces 136, inductive components 130 (e.g., a first inductor L1, a second inductor L2, a third inductor L3, etc.), capacitive components 132 (e.g., a capacitor C), and resistive components R coupled in parallel between two conductive test pads 124 (e.g., between a first conductive test pad 124-1 and a second conductive test pad 124-2).

The example of FIG. 5 is merely illustrative. If desired, components 130, 132, and 134 may include any desired number of capacitive elements, inductive elements, and resistive elements arranged in any desired manner (e.g., in series and/or in parallel). Test pads 124 may be coupled to traces 136 and elements 130, 132, and 134 at any desired location. If desired, test pad 124-1 may be connected to ground 138 (e.g., a ground plane of test PCB 120). If desired, components 130, 132, and 134 may have corresponding inductance, capacitance, and resistance values that have tight tolerances such as a tolerance of less than 2% (e.g., the values may have a margin of error of less than 2%) to ensure that measurements made by test system 106 are not dominated by variations in load 122.

Antenna impedance modeling circuit 122 may have a selected impedance provided by the arrangement of components 130, 132, 134, and traces 136 on TPCB 120. For example, modeling circuit 122 may have a selected number of conductive traces, inductive elements, capacitive elements, and/or resistive elements connected in a desired arrangement such that antenna impedance modeling circuit 122 has the same input impedance as the loop antenna 40 that is to be assembled onto that DUT 84' (e.g., modeling circuit 122 may model the input impedance of the antenna to be used on DUT 84', thereby providing DUT 84' with a terminated load that is similar to the terminated load that the device will have when fully assembled).

DUT 84' may include antenna feed terminals 80. For example, DUT 84' may include a first antenna feed terminal 80-1 and a second antenna feed terminal 80-1 (e.g., feed points 80 may be formed as conductive pads or traces on a corresponding circuit board). When a given DUT 84' is loaded into test fixture 116, antenna feed terminals 80 on DUT 84' may be coupled to antenna impedance modeling circuit 122 via contact structures 128 (shown as dashed paths 128-1 and 128-2). For example, first contact path 128-1 may be coupled between first feed terminal 80-1 on DUT 84' and first test pad 124-1, whereas second contact path 128-2 may be coupled between second feed terminal 80-2 on DUT 84' and second test pad 124-2. Contact paths 128 may maintain an electrical connection between pads 124 and antenna feeds 80 using any desired contact structures. As one example, contacts 128 may be soldered to test pads 124 and may include be held or compressed against antenna feeds 80 using pressure-providing structures such as pogo pins or spring contact structures (e.g., pogo pins in structures 128 may be soldered or welded to test pads 124 and may be held against antenna feeds 80 during testing, thereby allowing modeling circuit 122 to be used for testing many different DUTs 84').

In the example of FIG. 5, first antenna feed terminal 80-1 on DUT 84' may be a ground (negative) antenna feed terminal whereas second antenna feed terminal 80-2 may be a signal (positive) antenna feed terminal. Test equipment 110 may include signal generator equipment such as signal generator 140 and signal analysis equipment such as signal analyzer 142. Signal analysis equipment 142 and signal generator 140 may be coupled to test pads 124 on antenna impedance modeling circuit 122 via paths 125 and contacts 126 (e.g., via a first path 125-1, a second path 125-2, a third path 125-3, a first probe contact 126-1, and a second probe contact 126-2). Paths 125 may include any desired number of conductive lines (e.g., conductive wires, transmission line structures, etc.). For example, paths 125 may include two coaxial cables each connecting a respective one of analysis equipment 142 and generator 140 to contacts 126.

Figure 6:
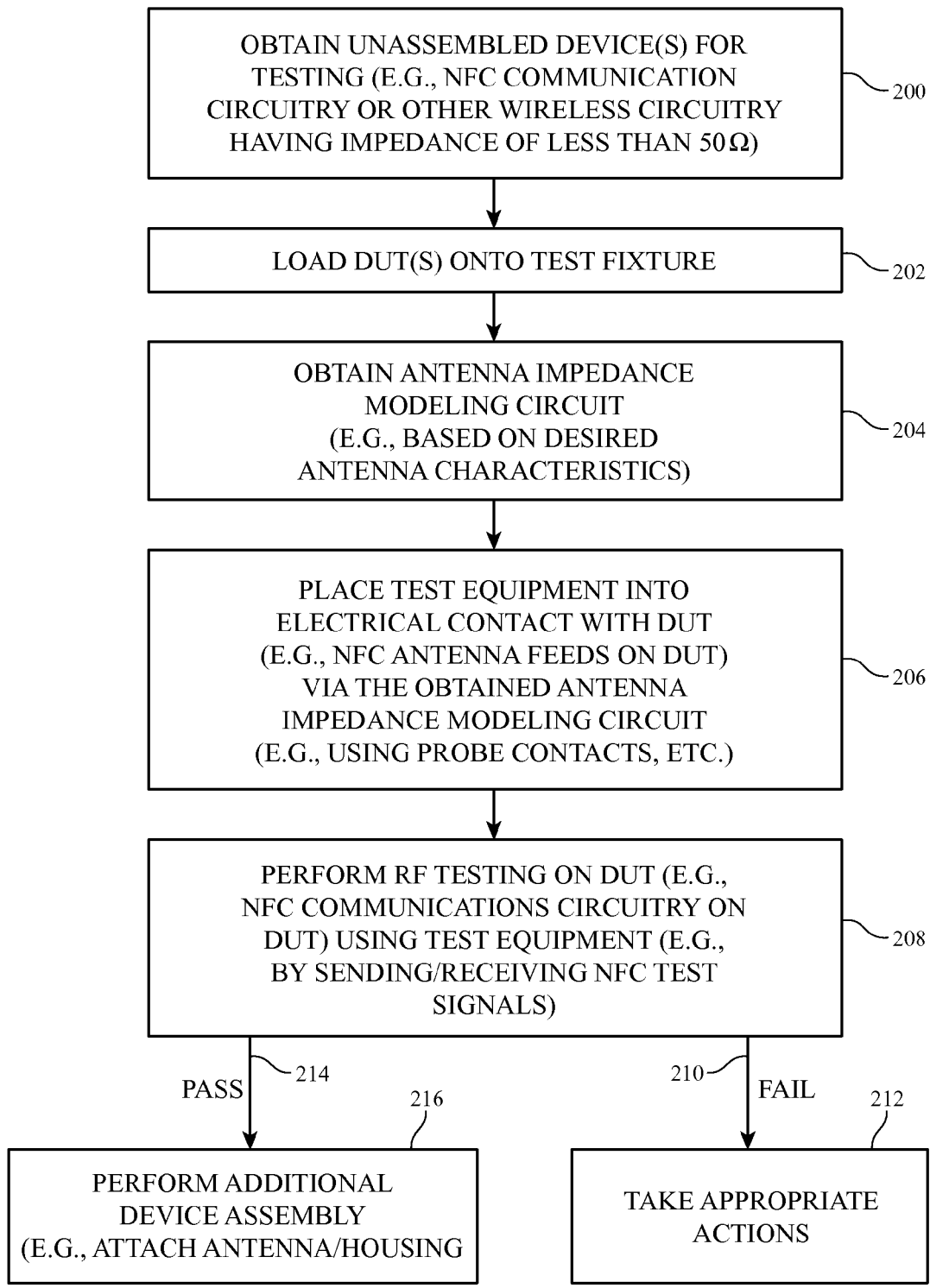
FIG. 6 is a flow chart of illustrative steps that may be performed by radio-frequency test equipment for performing radio-frequency testing on near-field communications circuitry prior to assembling the near-field communications circuitry within a completed electronic device in accordance with an embodiment of the present invention.

In the example of FIG. 6, a signal port of signal generator 140 may be coupled to test pad 124-2 via path 125-2 and connector 126-2. If desired, a resistor divider structure 127 may be interposed on path 125-2 between generator 140 and connector 126 (e.g., to obstruct an impedance load of signal generator 140). If desired, resistor structures 127 may be formed as a conductive trace on test PCB 120 or as a discrete component on test PCB 120. Test pad 124-2 may serve as a signal (positive) test pad that electrically connects signal generator 140 to positive antenna feed terminal 80-2 of DUT 84' (e.g., via connector 128-2). Signal generator 140 may be grounded to test pad 124-1 via path 125-1 and test pad 124-1. Test pad 124-1 may serve as a ground (negative) test pad that couples signal generator 140 to negative antenna feed terminal 80-2 of DUT 84' (e.g., via connector 128-1). Signal generator 140 may generate test signals and may provide the test signals to DUT 84' via paths 125-1 and 125-2, contacts 126-1 and 126-2, test pads 124-1, and 124-2, antenna impedance modeling circuit 122, and contacts 128-1 and 128-2. DUT 84' may receive the test signals via antenna terminals 80-1 and 80-2. The generated test signals may be generated according to a near-field communications protocol. DUT 84' may generate performance metric data based on the received test signals (e.g., performance metric values associated with receiving radio-frequency signals).

Signal analysis equipment 142 may be coupled to test pad 124-2 via connector 126-2 and signal path 125-3. If desired, DUT 84' may generate additional test signals (e.g., in response to receiving test signals from signal generator 140, in response to receiving control signals from test host 112 of FIG. 4 or from a user such as a test station operator) and may convey the test signals to signal analysis equipment 142 via radio-frequency contacts 128-1 and 128-2, antenna impedance modeling circuit 122, contact 126-2, and path 125-3. DUT 84' may generate the additional test signals using a near-field communications protocol (e.g., the same NFC protocol with which signal generator 140 generates test signals). If desired, DUT 84' may provide generated performance metric data to test equipment 110 via antenna modeling circuitry 122 or via other conductive paths between DUT 84' and test equipment 110. Signal analysis equipment 142 may analyze the radio-frequency signals received from DUT 84' and may generate performance metric data associated with the radio-frequency performance of DUT 84'. Signal analysis equipment 142 may provide radio-frequency performance metric data (e.g., data generated by analysis equipment 142 and/or DUT 84') to test host 112 for further processing. If desired, DUT 84' may be coupled to test host 112 via other conductive paths and may provide generated performance metric data to test host 112 directly.

Signal analysis equipment 142 and signal generator 140 may, for example, have an impedance of 50 Ohms (e.g., BNC connectors or other 50 Ohm radio-frequency connectors may be formed at the interface of equipment 142 and 140 and path 125), whereas DUT 84' has an impedance of less than 50 Ohms (e.g., 20 Ohms or less). By coupling antenna feeds 80 on DUT 84' to antenna modeling circuit 122 having a selected impedance that matches the impedance of DUT 84', DUT 84' may be provided with a suitable terminated load at antenna feed terminals 80 and may thereby transmit suitable signals having a maximum power transfer (e.g., a maximum resonance) indicative of normal operation of DUT 84' (e.g., operation of DUT 84' after incorporation into a completed device). Radio-frequency testing may therefore be indicative of the performance of DUT 84' during normal operation of assembled device 10.

If desired, a single device under test may be coupled to different antenna impedance modeling circuits created to model the impedance of different designs for antenna 40 (e.g., to perform radio-frequency testing on the NFC circuitry in the device under test for a wide range of different antenna designs). If desired, multiple DUTs 84' may be tested using the same configuration of antenna impedance modeling circuitry 122 (e.g., so that multiple devices 84' may be tested for a given antenna design in parallel).

FIG. 6 is a flow chart of illustrative steps that may be performed by a test system such as test system 106 as shown in FIGS. 4 and 5 for performing radio-frequency testing on near-field communications circuitry such as DUT 84'. The steps of FIG. 6 may be performed, for example, after forming the near-field communications circuitry as shown in FIG. 2 onto a circuit board substrate and prior to attaching loop antenna 40 to antenna feed points 80 in the near-field communications circuitry.

At step 200, test system 106 may obtain unassembled components of an electronic device for testing. For example, test system 106 may obtain NFC communications circuitry such as NFC circuitry 84 of FIG. 2 for testing prior to full assembly of electronic device 10 (e.g., over a corresponding assembly line 104 as shown in FIG. 3). The obtained NFC circuitry under test (DUT) 84' may have an impedance of less than 50 Ohms and/or may be used for sending and receiving radio-frequency NFC signals using a loop antenna (e.g., over a range of 20 cm or less) that has yet to be assembled onto the device under test.

At step 202, DUT 84' may be loaded onto test fixture 116 (as shown in FIGS. 4 and 5). For example, a test station operator may place DUT 84' onto test fixture 116 or DUT 84' may be autonomously placed within test fixture 116. If desired, multiple DUTs 84' may be tested in parallel by loading the DUTs onto test tray 118 and mounting test tray 118 within test fixture 116.

At step 204, test system 106 may obtain one or more antenna impedance modeling circuits such as antenna impedance modeling circuit 122 for modeling the impedance of an NFC loop antenna. Impedance modeling circuit 122 may be designed and built to have a selected impedance that matches the antenna impedance of an associated design for loop antennas 40 that are to be attached to DUTs 84' at a later time. If desired, impedance modeling circuit 122 may be formed from conductive traces and circuit components on test PCB 120. Test PCB 120 may include other impedance modeling circuits 122 for testing multiple DUTs 84' in parallel.

At step 206, test system 106 may place test equipment 110 into electrical contact with loaded DUT 84' via antenna impedance modeling circuit 122 (e.g., as shown in FIG. 5). For example, test equipment contact structures 126 may be placed into electrical contact with test pads 124 on antenna impedance modeling circuit 122. Test fixture contact structures 128 may be placed into contact with corresponding antenna feeds 80 on DUT 84'. In this way, radio-frequency signals may be conveyed between DUT 84' and test equipment 110 through contacts 126, antenna impedance modeling circuit 122, and contacts 128. Performing radio-frequency testing by forming a direct electrical connection using a conductive path (e.g., a path including contacts 126 and 128 and modeling circuit 122) may sometimes be referred to herein as performing contact-based radio-frequency testing or wired radio-frequency testing (e.g., as opposed to scenarios in which wireless radio-frequency testing is performed without establishing a conductive path between the test equipment and the NFC circuitry under test). If desired, multiple sets of contacts may be used for coupling multiple DUTs 84' to test equipment 110 via respective antenna impedance modeling circuits 122 (e.g., for performing testing on multiple DUTs 84' in parallel).

At step 208, test system 106 may perform radio-frequency testing on DUT 84' by generating and transmitting radio-frequency test signals to DUT 84' (e.g., test signals generated in a 13.56 MHz near-field communications frequency band and using a near-field communications protocol). If desired, processing circuitry on DUT 84' (e.g., test software running on processor 29 of FIG. 2) may direct DUT 84' to generate radio-frequency test signals (e.g., autonomously, based on instructions received from test host 112, or in response to receiving test signals from test equipment 110). DUT 84' and/or test equipment 110 may gather performance metric information using the test signals to determine whether DUT 84' has sufficient radio-frequency performance.

For example, test equipment 110 may perform pass/fail test operations on DUT 84' using the generated performance metric data. DUTs 84' that exhibit satisfactory radio-frequency performance for each tested performance metric may be labeled as "passing" devices. DUTs 84' that exhibit unacceptable radio-frequency performance for one or more radio-frequency performance metrics may be labeled as "failing" devices. If DUT 84' passes the testing (e.g., is labeled a passing device), processing may proceed to step 216 as shown by path 214.

At step 216, DUT 84' may be further assembled (e.g., using assembly equipment 108 of FIG. 3), tested, and/or provided to users for normal device operation. For example, DUT 84' may be passed to assembly equipment for attaching a loop antenna 40 to antenna feed terminals 80 on DUT 84' (e.g., an antenna 40 having an impedance modeled by obtained impedance modeling circuit 122). If desired, DUT 84' may be assembled within a conductive housing such as housing 12. In some scenarios, portions of housing 12 may form a part of loop antenna 80 that is attached to DUT 84' (e.g., portions of housing 12 may be electrically connected to antenna feed terminals 80). If DUT 84' fails testing (e.g., is labeled a failing device), processing may proceed to step 212 as shown by path 210. At step, 212, test system 106 may take appropriate actions to handle the failing DUT. For example, the failing DUT may be discarded, calibrated, re-tested, reworked, redesigned, one or more components on board 84' may be replaced, etc.

Figure 7:
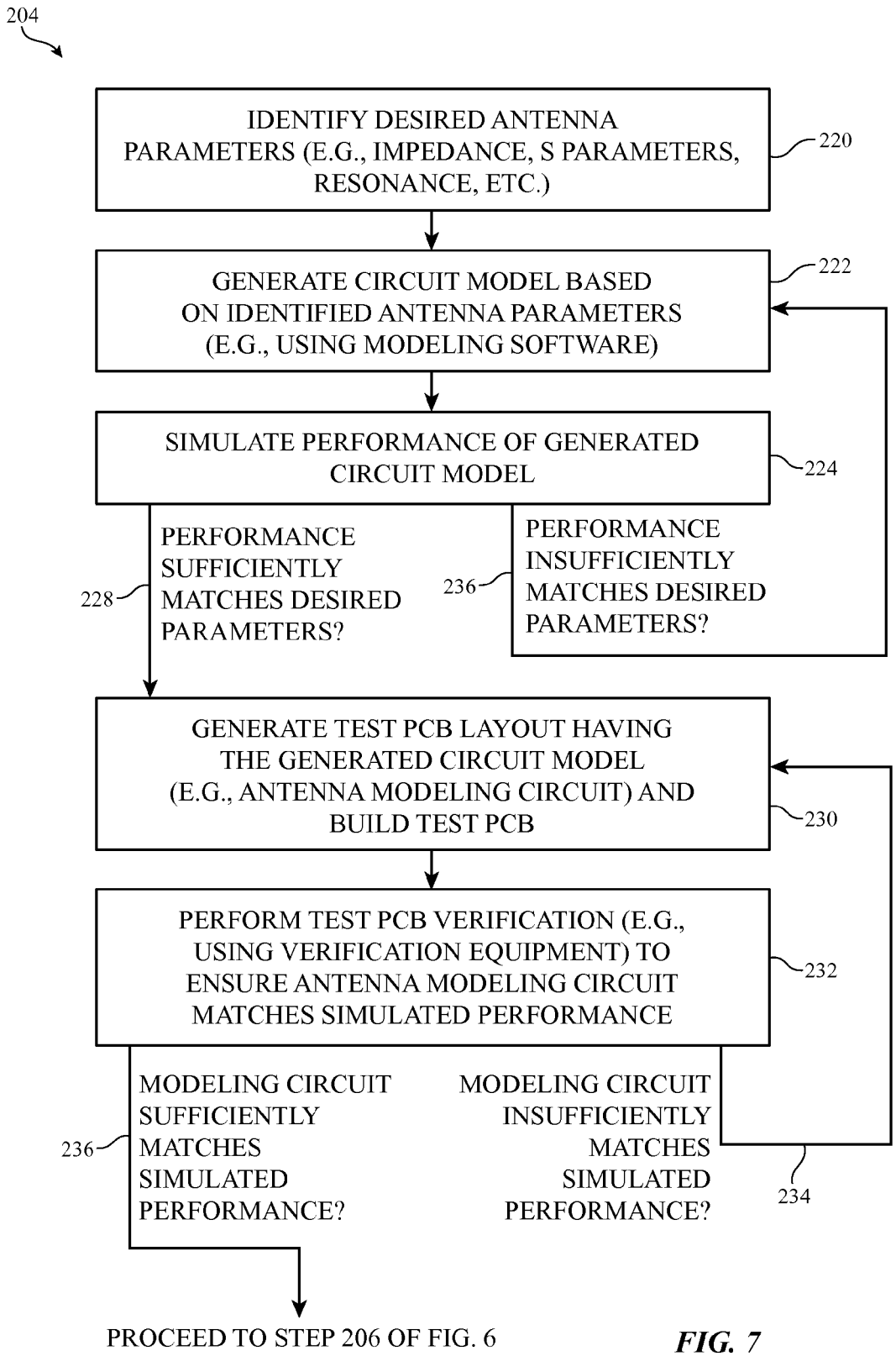
FIG. 7 is a flow chart of illustrative steps that may be performed by radio-frequency test equipment for obtaining an antenna impedance matching circuit for performing radio-frequency testing on near-field communications circuitry prior to assembly of the near-field communications circuitry within a fully-assembled electronic device in accordance with an embodiment of the present invention.

FIG. 7 is a flow chart of illustrative steps that may be performed by test system 106 and/or other testing equipment to obtain an antenna impedance modeling circuit for performing radio-frequency testing on NFC device under test 84' (e.g., so that DUT 84' has a suitable terminated load even though DUT 84' is not connected to a corresponding antenna). The steps of FIG. 7 may, for example, be performed while processing step 204 of FIG. 6. The steps of FIG. 7 may be performed by test system 106 and/or using other computing equipment (e.g., using one or more computers located remote to test station 106). A scenario in which test host 112 and verification equipment 114 of test station 106 perform the steps of FIG. 7 is described herein as an example.

At step 220, test host 112 may identify desired antenna parameters associated with antenna 40 that is to be connected to DUT 84'. For example, test host 112 may receive antenna parameters associated with a selected design of antenna 40 (e.g., the antenna parameters may be provided by designers of antenna 40 or from any other desired source). The antenna parameters may include, for example, antenna impedance, scattering parameters, resonance frequencies, or any other desired electromagnetic parameters associated with antenna 40.

At step 222, test host 112 may generate an impedance circuit model based on the identified antenna parameters. For example, circuit modeling software running on test host 112 may be used (e.g., by a test station operator or designer of NFC circuitry 84') to generate a circuit model that implements the identified antenna parameters. Test host 112 may determine a number, size, and arrangement of resistive, capacitive, and/or inductive elements for use in the circuit model such that a circuit having those elements operates at the identified antenna parameters. For example, the generated circuit model may model the impedance of the desired antenna 40. In the example of FIG. 5, the generated circuit model may identify four inductors L1, L2, L3, and L4 coupled in together in series and coupled in parallel with a capacitor C and a resistor R that is expected to have the desired antenna parameters when provided with radio-frequency signals. A radio-frequency performance simulation may be performed on the circuit model to verify that the model accurately exhibits the desired antenna parameters.

At step 224, simulation software running on test host 112 or on other computing equipment may simulate the radio-frequency performance of the generated circuit model. For example, test host 112 may simulate the power transfer of the generated circuit model when provided with radio-frequency signals. Test host 112 may compare the simulated performance of the circuit model with the desired antenna parameters (e.g., as identified at step 220). For example, test host 112 may simulate the performance of an antenna modeling circuit having four inductors L1, L2, L3, and L4 coupled together in series and coupled in parallel with a capacitor C and a resistor R and may compare the simulated performance to the desired antenna parameters (e.g., test host 112 may compare a simulated impedance of the modeling circuit to the desired antenna impedance).

If the simulated performance of the generated circuit model insufficiently matches the desired antenna parameters, processing may loop back to step 222 as shown by path 226 to regenerate an additional circuit model (e.g., a circuit model having a different number, size, and arrangement of capacitive, resistive, and/or inductive elements). If the simulated performance of the generated circuit model sufficiently matches the desired antenna parameters, processing may proceed to step 230 as shown by path 228.

At step 230, layout generation circuitry on test host 112 may generate a layout for test PCB 120 (FIG. 5) that incorporates the generated circuit model. For example, test host 112 may generate an arrangement for conductive traces such as traces 136 on TPCB 120 that connect the inductive, capacitive, and resistive elements of the circuit model so that antenna modeling circuit 122 may be formed on test PCB 120. Circuit fabrication equipment and/or operators of system 106 may build test PCB 120 having the generated layout (e.g., may pattern conductive traces, resistive, capacitive, and inductive components on a test PCB 120 for use during testing). When implemented onto circuit board 120, the generated circuit layout may sometimes be referred to herein as antenna modeling circuit 122. As the placement of conductive traces 136 on test PCB 120 may contribute to the capacitance and inductance of antenna impedance modeling circuit 122, additional verification operations may be needed to ensure that test PCB 120 suitably matches the desired antenna parameters.

At step 232, verification equipment 114 may perform test PCB verification operations on the antenna modeling circuit patterned onto test PCB 120. If desired, verification equipment 114 may include radio-frequency test probe equipment, signal generator equipment, and/or signal analyzer equipment for verifying the radio-frequency performance of antenna modeling circuit 122. For example, verification equipment 114 may measure the impedance, scattering parameters, resonance frequency, or any other desired radio-frequency parameters of the generated antenna impedance modeling circuit. Verification equipment 114 may compare the measured radio-frequency parameters of antenna modeling circuit 122 to the simulated performance of the circuit model implemented by antenna modeling circuit 122 (e.g., may compare the measured impedance of circuit 122 to the simulated impedance of circuit 122 as determined at step 224). In this way, verification equipment 114 may verify that the physical implementation of the circuit model has a corresponding radio-frequency performance that matches the simulated performance.

If the radio-frequency performance of antenna modeling circuit 122 insufficiently matches the simulated performance of the circuit model implemented by circuit 122, processing may loop back to step 230 as shown by path 234 to generate an additional layout (e.g., arrangement of conductive traces 136) for test PCB 120. If the radio-frequency performance of antenna modeling circuit 122 sufficiently matches the simulated performance of the circuit model implemented by circuit 122, the test PCB may be used for performing testing on DUTs 84' (e.g., processing may proceed to step 206 of FIG. 6). In this way, test system 106 may obtain antenna impedance modeling circuits that accurately model the antenna 40 that is to be used with DUT 84' (e.g., so that the NFC circuitry in DUTs 84' is provided with a suitable terminating load).

The example of FIG. 7 is merely illustrative. If desired, the circuit model for antenna impedance modeling circuitry 122, the simulation software for simulating the performance of the circuit model, the layout generation software for generating test PCB layouts, and/or verification equipment 114 be formed on remote computing equipment located at a different geographical location from test system 106 (e.g., steps 220-232 may be performed at test system 106 or at another location remote from test system 106).

The foregoing is merely illustrative of the principles of this invention and various modifications can be made by those skilled in the art without departing from the scope and spirit of the invention. The foregoing embodiments may be implemented individually or in any combination.

What is claimed is:

1. A method of using a test system to perform radio-frequency testing on wireless communications circuitry, wherein the wireless communications circuitry comprises near-field communications transceiver circuitry coupled to an antenna feed terminal, the method comprising:

placing test equipment in the test system into electrical contact with the antenna feed terminal, wherein placing the test equipment into electrical contact with the antenna feed terminal comprises:
electrically connecting the antenna feed terminal to an antenna impedance modeling circuit; and
electrically connecting the test equipment to the antenna impedance modeling circuit; and
with the test equipment, providing radio-frequency test signals to the near-field communications transceiver circuitry via the antenna feed terminal.

2. The method defined in claim 1, further comprising:
with the test equipment, receiving additional radio-frequency test signals from the near-field communications transceiver circuitry via the antenna feed terminal.

3. The method defined in claim 2, further comprising:
with the test equipment, generating radio-frequency performance metric data associated with the wireless communications circuitry based on the received additional radio-frequency test signals.

4. The method defined in claim 3, further comprising:
with the test equipment, determining whether the wireless communications circuitry passes testing based on the generated radio-frequency performance metric data; and
with assembly equipment, connecting an antenna to the antenna feed terminal in response to determining that the wireless communications circuitry passes testing.

5. The method defined in claim 4, wherein the test equipment has a first impedance and the near-field communications transceiver circuitry has a second impedance that is less than the first impedance.

6. The method defined in claim 1, wherein placing the test equipment into electrical contact with the antenna feed terminal comprises:
electrically connecting the antenna feed terminal to a conductive trace on a printed circuit board; and
electrically connecting the test equipment to the conductive trace on the printed circuit board.

7. The method defined in claim 1, wherein providing the radio-frequency test signals to the near-field communications transceiver circuitry via the antenna feed terminal comprises:
providing the radio-frequency test signals to the antenna feed terminal via the antenna impedance modeling circuit.

8. The method defined in claim 7, further comprising:
with the test equipment, determining whether the wireless communications circuitry passes testing;
with the test equipment, providing the wireless communications circuitry to assembly equipment in response to determining that the wireless communications circuitry passes testing; and
with the assembly equipment, connecting an antenna to the antenna feed terminal in response to determining that the wireless communications circuitry passes testing, wherein the antenna has an impedance that is modeled by the antenna impedance modeling circuit.

9. The method defined in claim 8, wherein connecting the antenna to the antenna feed terminal comprises connecting a loop antenna to the antenna feed terminal, wherein the near-field communications transceiver circuitry is configured to receive radio-frequency signals from external circuitry via the loop antenna.

10. A method for using a test system to characterize near-field communications circuitry, wherein the test system comprises radio-frequency test equipment, the method comprising:
with the radio-frequency test equipment, obtaining an antenna impedance modeling circuit that includes conductive traces on a printed circuit board;
electrically connecting the radio-frequency test equipment to the antenna impedance modeling circuit;
electrically connecting the near-field communications circuitry to the antenna impedance modeling circuit; and
conveying radio-frequency test signals between the radio-frequency test equipment and the near-field communications circuitry over the antenna impedance modeling circuit.

11. The method defined in claim 10, wherein obtaining the antenna impedance modeling circuit comprises:
identifying desired antenna parameters;
generating a circuit model based on the desired antenna parameters; and
patterning the conductive traces onto the printed circuit board based on the generated circuit model.

12. The method defined in claim 10, wherein the antenna impedance modeling circuit comprises at least one inductive component and at least one capacitive component coupled in parallel between first and second conductive contact pads on the printed circuit board, wherein electrically connecting the radio-frequency test equipment to the antenna impedance modeling circuit comprises electrically connecting the radio-frequency test equipment to the first and second conductive contact pads, and wherein electrically connecting the near-field communications circuitry to the antenna impedance modeling circuit comprises electrically connecting the near-field communications circuitry to the first and second conductive contact pads.

13. The method defined in claim 10, wherein the test equipment has a first impedance and wherein obtaining the antenna impedance modeling circuit comprises obtaining an antenna impedance modeling circuit having a second impedance that is less than the first impedance.

14. The method defined in claim 10, further comprising:
with the test equipment, performing pass-fail testing on the near-field communications circuitry based on the radio-frequency test signals; and
with assembly equipment, assembling the near-field communications circuitry within an electronic device housing in response to determining that the near-field communications circuitry passes the pass-fail testing.

15. A test system for performing radio-frequency test operations on near-field communications circuitry, comprising:
radio-frequency test equipment, wherein the radio-frequency test equipment has a first impedance and the near-field communications circuitry has a second impedance that is less than the first impedance; and
a conductive path connected between the radio-frequency test equipment and the near-field communications circuitry, wherein the radio-frequency test equipment is configured to receive radio-frequency test signals from the near-field communications circuitry over the conductive path.

16. The test system defined in claim 15, wherein the conductive path further comprises:
an antenna impedance modeling circuit, wherein the near-field communications circuitry is configured to transmit signals using an antenna having an impedance that is modeled by the antenna impedance modeling circuit.

17. The test system defined in claim 16, wherein the first impedance is greater than or equal to 50 Ohms and the antenna impedance modeling circuit has an impedance that is less than 50 Ohms.

18. The test system defined in claim 15, wherein the conductive path further comprises:
a first set of radio-frequency contacts;
a second set of radio-frequency contacts; and
an antenna impedance modeling circuit formed on a printed circuit board, wherein the first set of radio-frequency contacts are coupled between the antenna impedance modeling circuit and the test equipment and wherein the second set of radio-frequency contacts are coupled between at least one antenna feed terminal on the near-field communications circuitry and the antenna impedance modeling circuit.

19. The test system defined in claim 18, wherein the antenna impedance modeling circuit comprises first and second conductive contact pads on the printed circuit board, wherein the first set of radio-frequency contacts comprises a first radio-frequency contact that contacts the first conductive contact pad and a second radio-frequency contact that contacts the second conductive contact pad, wherein the second set of radio-frequency contacts comprises a third radio-frequency contact that contacts the first conductive contact pad and a fourth radio-frequency contact that contacts the second conductive contact pad, and wherein the radio-frequency test signals comprise radio-frequency signals generated using a near-field communications protocol.

* * * * *